Figure 1:
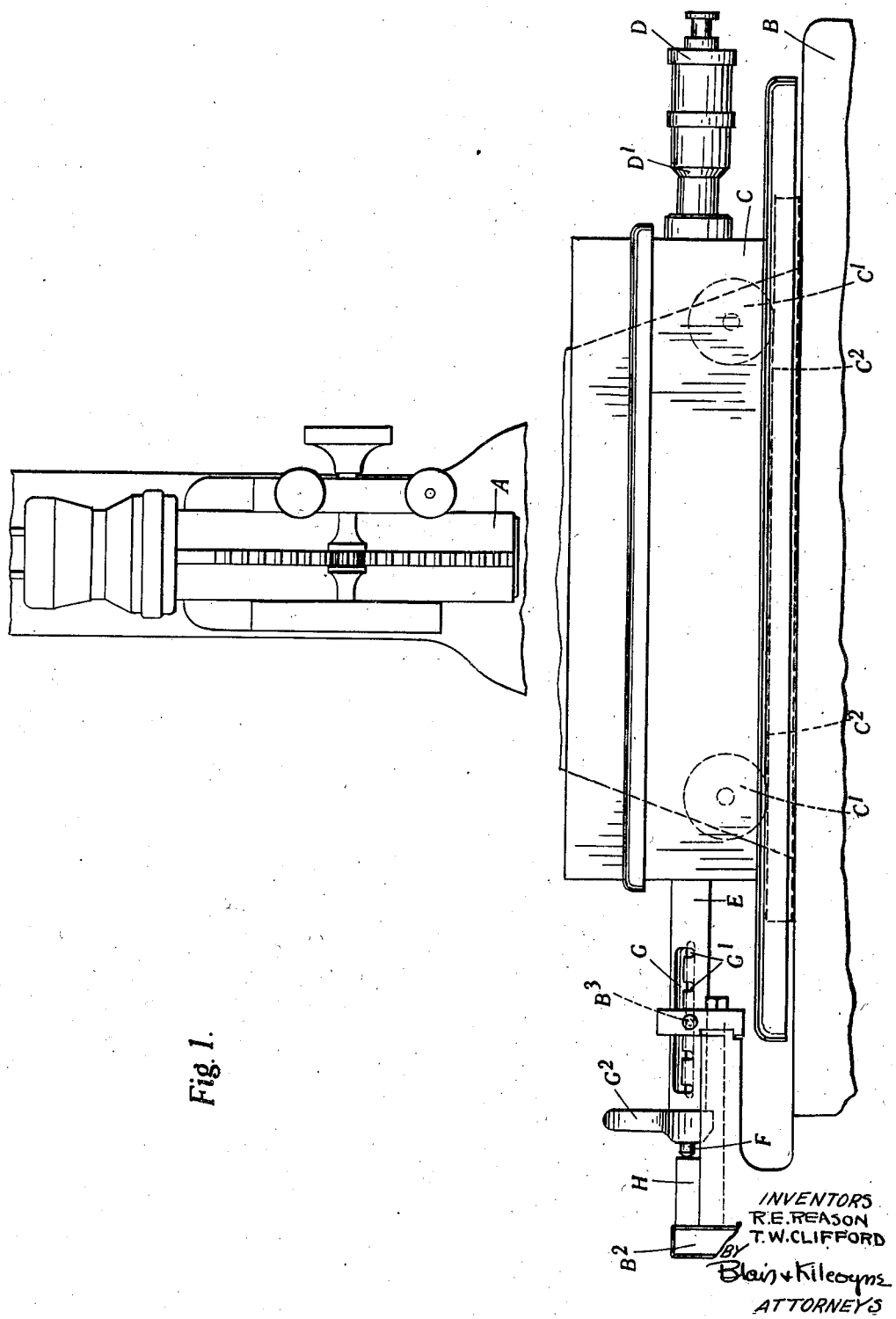

April 7, 1942.  R. E. REASON ET AL  2,278,945
MICROMETER ADJUSTMENT DEVICE
Filed Oct. 5, 1940  4 Sheets-Sheet 2
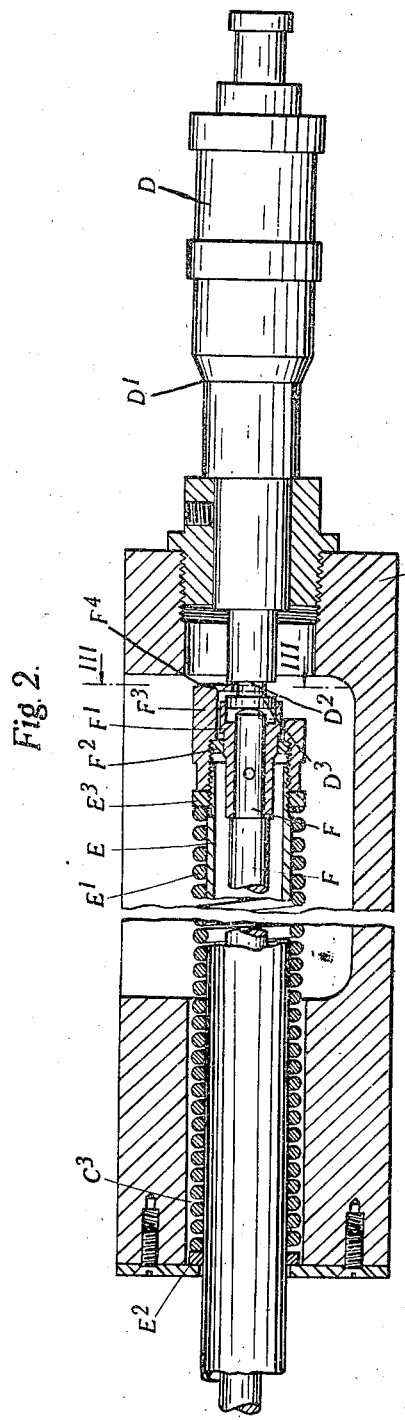
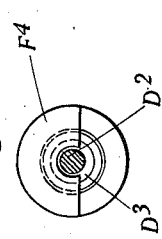
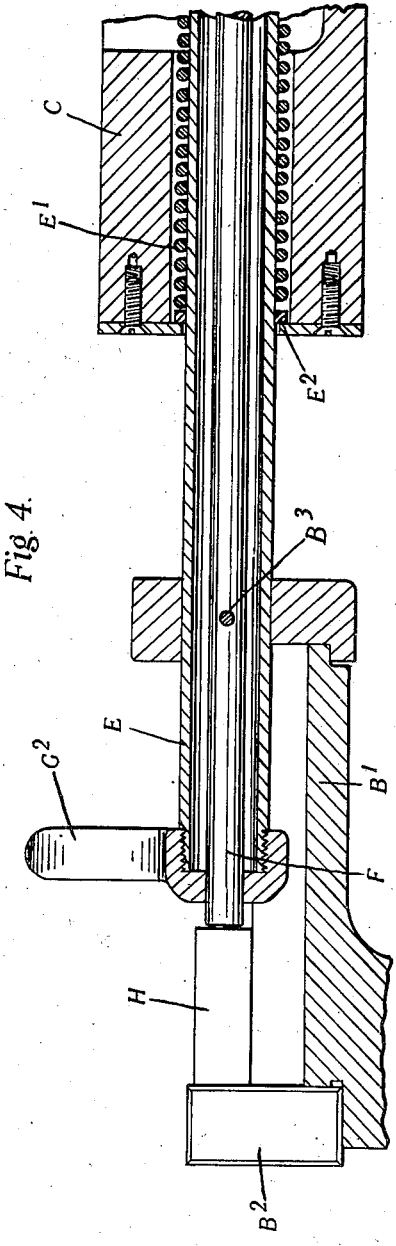
INVENTORS
R.E. REASON
T.W. CLIFFORD
BY Blain + Kilcoyne
ATTORNEYS

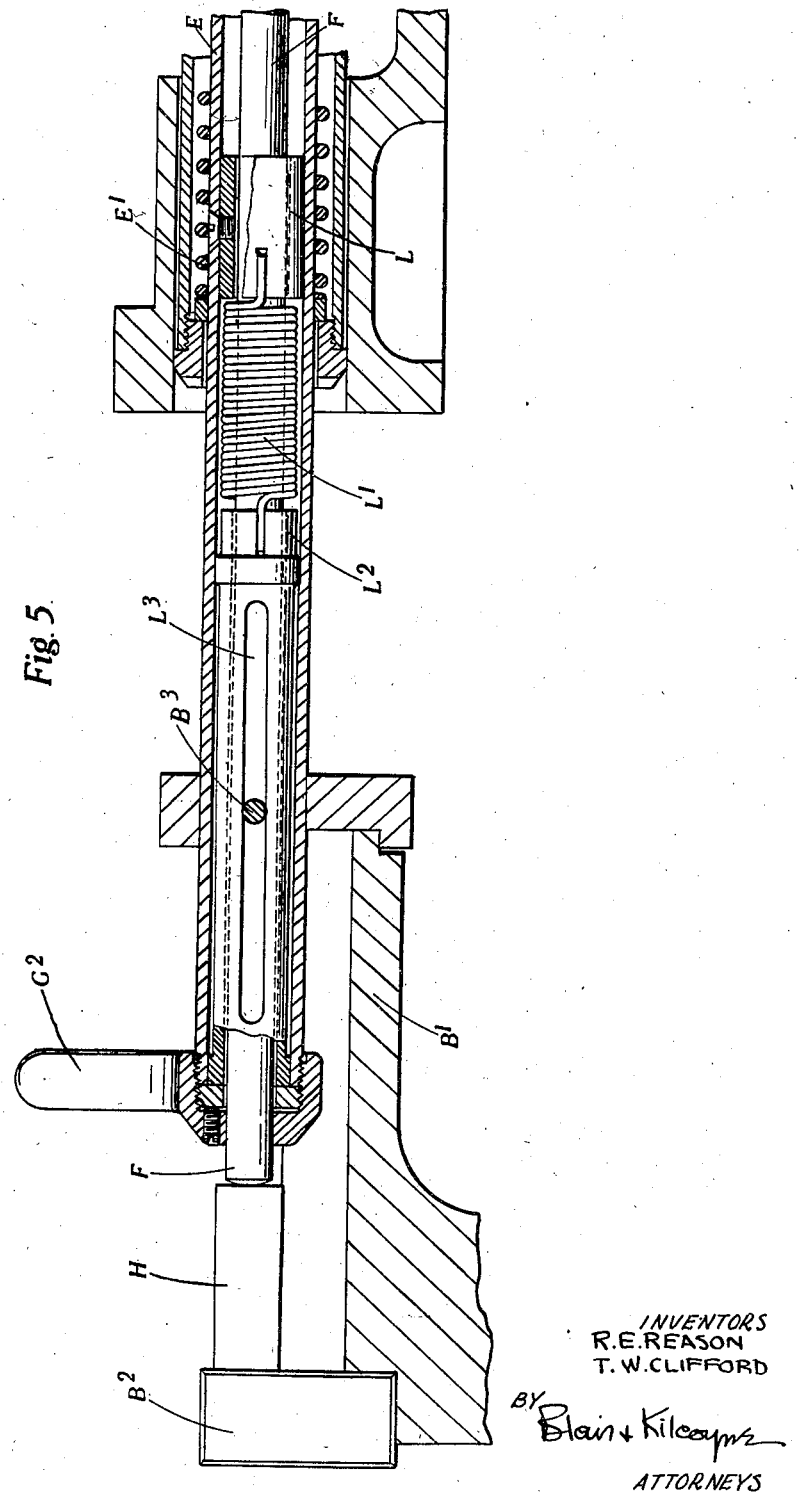

April 7, 1942.  R. E. REASON ET AL  2,278,945
MICROMETER ADJUSTMENT DEVICE
Filed Oct. 5, 1940  4 Sheets-Sheet 4
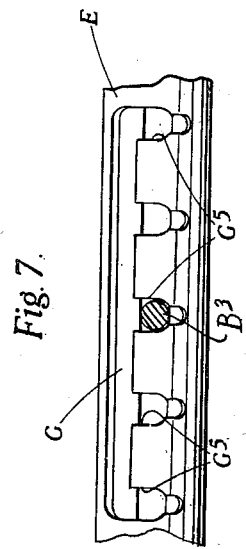
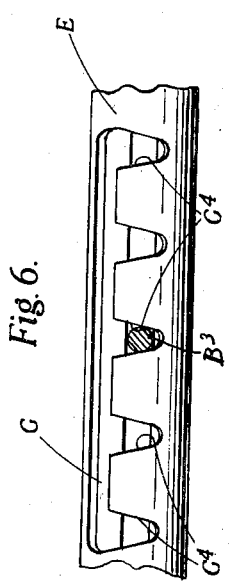
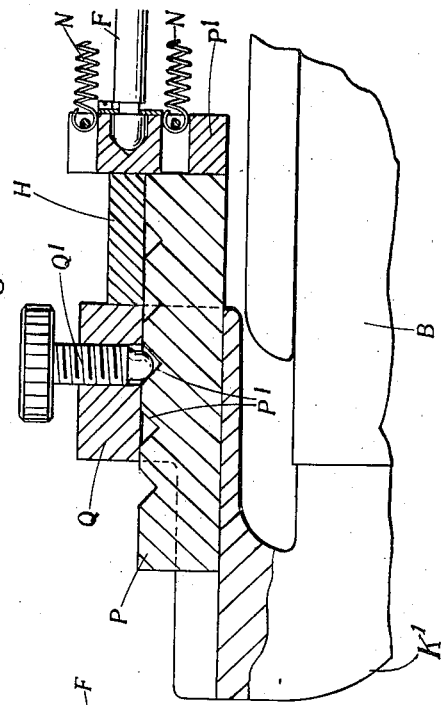
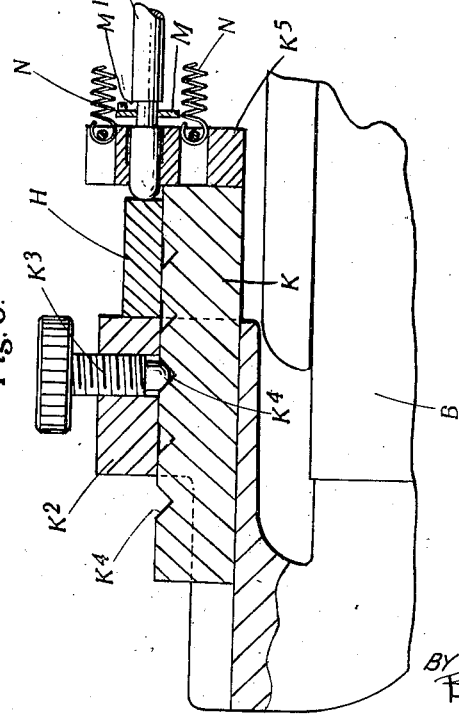
INVENTORS
R.E. REASON
T.W. CLIFFORD
BY Blair + Kilcoyne
ATTORNEYS Patented Apr. 7, 1942

2,278,945

UNITED STATES PATENT OFFICE 2,278,945

MICROMETER ADJUSTMENT DEVICE

Richard Edmund Reason and Thomas William Clifford, Leicester, England, assignors to Kapella Limited, Leicester, England, a company of Great Britain Application October 5, 1940, Serial No. 359,944
In Great Britain October 12, 1939

9 Claims. (Cl. 33—181)

This invention relates to micrometer adjustment devices of the kind comprising two relatively adjustable parts, namely a base and a carriage adjustable thereon by means of a micrometer mounted on one of these parts and urged by a spring or springs into abutment with the other part.

In known constructions the carriage is urged into abutment with the micrometer spindle by a loading spring acting between the carriage and the base, gauge blocks being inserted as required between the micrometer spindle and the carriage when it is desired to shift the range of adjustment effected by the micrometer. With such an arrangement, however, should the gauge block be inadvertently dislodged the carriage, under the action of the loading spring, crashes against the micrometer spindle with consequent risk of damage. Though pneumatic dashpots and geared ratchet escapement mechanisms have been proposed for checking the acceleration of the bearings, such devices present difficulties in design and manufacture if they are to be effective and are at the same time to have no disturbing effect on the measurements effected.

The primary object of the present invention is to provide a micrometer adjustment device of the above-mentioned kind wherein risk of damage through crashing of the carriage against the micrometer spindle in the event of dislodging of a gauge block is avoided, without introducing the difficulties involved in the use of dashpots or escapement mechanisms. To this end according to the present invention the loading spring, or each loading spring, acts between the carriage on which the micrometer is mounted and an auxiliary stop member adjustable relatively to a fixed abutment on the base, so that a gauge block can be inserted between the said abutment and the stop member, the arrangement being such that on removal of the gauge block the spring load, which would otherwise cause the carriage and the micrometer to crash through a distance corresponding to the spacing effected by the gauge block, is taken by the auxiliary stop member.

A more detailed object of the invention is to effect adjustment of the auxiliary stop member relatively to the fixed abutment on the base in a simple and convenient way, which will not interfere with the desired high degree of accuracy in measurement.

The invention may be carried into practice in various ways but some convenient arrangements according to the invention are shown by way of example in the accompanying drawings, in which Figure 1 shows in side elevation the upper part of the supporting base carrying the work carriage and micrometer, Figure 2 illustrates in vertical section and on an enlarged scale the arrangement of the tubular stop member and micrometer thrust rod within the work carriage, Figure 3 is a section on the line III—III of Figure 2, Figure 4 is a view similar to that of Figure 2 but of the opposite end of the thrust rod and the adjacent parts, Figure 5 shows in longitudinal section a modified arrangement of the thrust rod adjacent to the fixed abutment, Figures 6 and 7 illustrate two alternative forms of lateral slots for cooperation with the follower, and Figures 8 and 9 are two diagrammatic representations in longitudinal section of two further arrangements according to the invention.

In the construction shown in Figures 1 to 4 the microscope A is carried by a fixed base or support B, and a carriage C for the work is furnished with rollers $C^1$ cooperating with guides $C^2$ on the upper surface of the base B. A screw-threaded micrometer D furnished with a suitable scale $D^1$ is mounted on the carriage C so that the micrometer head projects from one side thereof, with the thrust spindle $D^2$ of the micrometer horizontal. As shown in Figure 2 the carriage C has an internal bore or space $C^3$ in which lies a tubular stop member E surrounded by a compression spring $E^1$ one end of which acts against a shoulder $E^2$ on the sliding carriage C whilst the other end acts against a ring $E^3$ threaded internally for engaging a screwthread on the end of the tubular stop member E lying adjacent to the thrust spindle $D^2$ of the micrometer.

Arranged within the tubular stop member E is a thrust rod F one end of which is furnished with a shoulder or flange $F^1$ which cooperates with a collar $F^2$ in screwthreaded engagement with an internal thread in a hollow lock-nut $F^3$ which is, in turn, in screwthreaded engagement with the external thread on the end of the tubular stop member E. The lock-nut $F^3$ has a forked or notched end wall $F^4$ (see Figure 3) behind which lies the head $D^3$ of the micrometer spindle $D^2$ which acts on the end of the thrust rod F, the micrometer spindle $D^2$ thus extending freely through the said notch or fork in the end wall $F^4$ which thus prevents unintentional separation of the micrometer spindle $D^2$ from the lock-nut $F^3$ though allowing slight longitudinal lost motion or back-lash between the shoulder $F^1$ and the internal adjustable collar $F^2$, and also between the flange $D^3$ on the micrometer spindle and the wall $F^4$ on the lock-nut $F^3$. The tubular stop member E is provided with a longitudinal slot G (Figure 1) into which open a plurality of transverse slots $G^1$ spaced apart in the direction of the length of the tube E. A fixed bracket $B^1$ on the base B or support carries a fixed abutment $B^2$ and also a stud or follower $B^3$ which engages the said longitudinal slot G, the tubular stop member E being provided with a handle $G^2$ by which it can be moved parallel to its longitudinal axis and turned about this axis so as to bring the follower $B^3$ into engagement with any one of the transverse slots $G^1$.

Normally the tubular stop member E is held fixed by the engagement of the follower $B^3$ in the end slot $G^1$, and the loading spring $E^1$ acts through the carriage C to urge the head $D^3$ of the micrometer spindle $D^2$ against one end of the thrust rod F whose other end is thus urged against the fixed abutment $B^2$ on the bracket $B^1$. Before inserting a gauge block H a reading is taken on the micrometer and the tubular stop member E is turned by means of the handle $G^2$ to bring the follower $B^3$ into the longitudinal slot G. The tubular stop member E is now moved longitudinally in a direction away from the abutment $B^2$ first taking up the slight back-lash between the shoulder or annular flange $F^1$ on the thrust rod F and the adjustable collar $F^2$ within the locknut $F^3$ on the adjacent end of the tubular stop member E, and then moving the whole carriage C, the movement continuing until the follower $B^3$ registers with the transverse slot $G^1$ whose spacing corresponds roughly to the spacing which is to be effected by the gauge block H, and the tubular stop member E is then rotated so that the follower $B^3$ engages this transverse slot $G^1$. The gauge block H is next inserted between the fixed abutment $B^2$ and the adjacent free end of the thrust rod F, the shoulder $F^1$ on the thrust rod F being thus again moved slightly away from the collar $F^2$ in the end of the tubular stop member E as permitted by the back-lash. The thrust rod F is thus accurately displaced longitudinally through a distance equal to the spacing effected by the gauge block H and this movement is transmitted directly through the micrometer to the carriage C. Rotation of the micrometer head will then move the carriage C relatively to the thrust rod F through such distance as may be called for by examination of the work through the microscope A, the micrometer giving a reading of such movement. Should the gauge block H inadvertently become dislodged from between the fixed abutment $B^2$ and the adjacent end of the thrust rod F the loading spring $E^1$ will merely cause the carriage C and micrometer D to move towards the fixed abutment $B^2$ on the base until the shoulder or flange $F^1$ on the thrust rod F abuts against the adjacent collar $F^2$ within the tubular stop member E, that is to say the carriage C will only move through the small distance permitted by the lost motion or back-lash and the load of the spring $E^1$ will be taken by the tubular stop member E. The distance through which the carriage moves is thus only a small fraction of that corresponding to the spacing effected by the gauge block H. It will be seen that the lost motion available between the micrometer spindle and the tubular stop member will be small since it need only be sufficient to compensate for the error in the spacing of the transverse slots $G^1$ in the tubular stop member E. For example, assuming this error to be of the order of .02 inch, the back-lash in either direction could be approximately .04 inch so that the maximum range through which the carriage C and micrometer D could be driven by the loading spring $E^1$ due to sudden removal of the gauge block H would not exceed .08 inch.

Under normal operating conditions, that is to say with the guides $C^2$ of the work carriage C horizontal, this arrangement is satisfactory but, should the guides be tilted whilst the follower $B^3$ is not in engagement with one of the lateral slots $G^1$ in the tubular stop member E and with the thrust rod F spaced from the fixed abutment $B^2$, the work carriage C is free to slide under the force of gravity. With a view to overcoming this difficulty there may be arranged within the stop member E a sleeve L which is (as shown in Figure 5) pinned to the stop member E so as to form an internal shoulder. One end of a torsion spring $L^1$ within the tubular stop member E engages a slot in the said sleeve L whilst the other end of the spring $L^1$ engages a slot in a length of tube $L^2$ lying within the stop member E at that part thereof adjacent to the longitudinal slot G in the tubular stop member E. The length of tube $L^2$ within the stop member E has a longitudinal slot $L^3$ into which extends the follower $B^3$, that is to say the follower $B^3$ carried by the fixed bracket $B^1$ on the base B extends through the longitudinal slot G in the tubular stop member E into the longitudinal slot $L^3$ in the length of tube $L^2$ within the stop member E. The torsion spring $L^1$ thus tends to turn the tubular stop member E about the said length of tube $L^2$ thereby urging that edge of the longitudinal slot $B^3$ in the stop member E having the lateral slots $G^1$ towards the follower $B^3$. In this way, even in the event of the mechanism being left with the follower $B^3$ between two lateral slots $G^1$ and the gauge block H removed the work carriage C can only slide until the follower $B^3$ registers with the next lateral slot $G^2$ into which the follower $B^3$ will snap under the action of the torsion spring $L^1$.

Each lateral slot is conveniently tapered as shown at $G^4$ in Figure 6 so as to increase in width towards its open mouth or, for ease in manufacture, each slot may be relieved so as to have the shape shown at $G^5$ in Figure 7. With the follower $B^3$ pressed into a lateral slot $G^4$ or $G^5$ by the action of the torsion spring $L^1$ the parts will be firmly held against "shake" in the direction of the length of the thrust rod F. Further, when the shoulder $F^1$ on the thrust rod F bears against the collar or flange $F^2$ inside the hollow lock-nut $F^3$, the work carriage C may be utilised for measuring purposes without the use of gauge blocks.

In the modified arrangement shown diagrammatically in Figure 8, the auxiliary stop member is constituted by an auxiliary carriage K adjustable on a bracket $K^1$ carried by the base or support B. The bracket $K^1$ is furnished with a fixed abutment $K^2$ through which extends a locking stud $K^3$ arranged to cooperate with a number of dimples or recesses $K^4$ longitudinally spaced apart in the face of the auxiliary carriage K. Alternatively the auxiliary carriage K may be locked by the stud in any position of adjustment as determined by a graduated scale. That end of the micrometer thrust rod F adjacent to the auxiliary carriage K extends through a passage in a head K⁵ carried thereby and has an anular groove M¹ forming a neck extending through a washer or plate M secured to the head K⁵ of the auxiliary carriage K. With this arrangement a coarse adjustment is first effected by setting the auxiliary carriage K relatively to the fixed abutment K² in accordance with the spacing which is to be effected by the gauge block H, the auxiliary carriage K being then locked in the position of adjustment by the locking stud K³. The gauge block H is inserted between the fixed abutment K² and the end of the micrometer thrust rod F projecting through the head K⁵. The insertion of the gauge block H will cause axial movement of the thrust rod F relatively to the auxiliary carriage through a distance equal to the difference between the actual spacing effected by the gauge block H and the coarse initial adjustment effected by adjustment of the auxiliary carriage K. Should the gauge block H be inadvertently dislodged the loading springs N will move the carriage supporting the micrometer only through the small distance through which the thrust rod F has been displaced relatively to the washer M carried by the auxiliary carriage K, and not through the relatively large distance corresponding to the spacing effected by the gauge block H.

In yet a further construction shown diagrammatically in Figure 9 the auxiliary stop member is constituted by an auxiliary carriage P as above described but a fine adjustment is provided for the auxiliary carriage P relatively to the fixed abutment Q in accordance with the spacing to be effected by the gauge block H. To this end the gauge block H is inserted between the head P¹ on the auxiliary carriage P and the fixed abutment Q which is furnished with a locking stud Q¹ adapted to engage dimples or recesses P² spaced apart in the auxiliary carriage P. Having inserted the gauge block H the auxiliary carriage P is adjusted to bring the gauge block firmly against the fixed abutment Q, whereupon the auxiliary carriage P is locked in the position of adjustment by the locking stud Q¹. The micrometer thrust rod F then bears directly against the head P¹ of the auxiliary carriage P so that, should the gauge block H be inadvertently removed, there will be no movement of the main carriage C and micrometer D relatively to the fixed abutment Q and the base or support B.

In each of the above constructions the connections between the micrometer spindle and the thrust rod, as also between the thrust rod and the auxiliary stop member, are such that whilst permitting relative rotation between these parts separation of the parts in the direction of the length of the thrust rod and micrometer spindle is prevented.

What we claim as our invention and desire to secure by Letters Patent is:

1. In a micrometer adjustment device, in combination, a base, means for mounting a microscope on the base, a carriage adjustable over said base, a micrometer mounted on said carriage, a fixed abutment on the base, an auxiliary stop member between the carriage and the fixed abutment, and at least one spring acting between the carriage and the base thus urging the carriage towards the fixed abutment, the auxiliary stop member being adjustable relatively to the fixed abutment so that a gauge block can be inserted between the abutment and the stop member and, on removal of the gauge block, the spring load, which would otherwise cause the carriage and micrometer to crash through a distance corresponding to the spacing effected by the gauge block, is taken by the auxiliary stop member.

2. In a micrometer adjustment device, in combination, a base, means for mounting a microscope on the base, a carriage adjustable over said base, a micrometer mounted on said carriage and comprising a head and a spindle, a fixed abutment on the base, an auxiliary stop member between the carriage and said base, a spring acting between the carriage and the base thus urging the carriage towards the fixed abutment, the thrust of the micrometer spindle being applied directly to the auxiliary stop member, and means for accurately adjusting the auxiliary stop member relatively to said fixed abutment in accordance with the operative dimension of a gauge block which can be inserted between the abutment and the stop member, and on removal of the gauge block, the spring load, which would otherwise cause the carriage and micrometer to crash through a distance corresponding to the spacing effected by the gauge block, is taken by the auxiliary stop member.

3. In a micrometer adjustment device, in combination, a base, a microscope mounting on the base, guides on the base, a carriage adjustable along said guides, a micrometer mounted on said carriage and comprising a head and a spindle, a fixed abutment on the base, an auxiliary stop member between the carriage and the base, a spring acting between the carriage and the base thus urging the carriage towards the fixed abutment, and means for effecting coarse adjustment of the auxiliary stop member relatively to the abutment in accordance with the operative dimension of a gauge block which can be inserted between the auxiliary stop member and the abutment, the thrust of the micrometer spindle being applied directly to the gauge block with a limited degree of lost motion between the micrometer spindle and the auxiliary stop member, so that, on removal of the gauge block, the spring load, which would otherwise cause the carriage and micrometer to crash through a distance corresponding to the spacing effected by the gauge block, is taken by the auxiliary stop member.

4. A micrometer adjustment device as claimed in claim 2, in which the auxiliary stop member is movable over the base, and can be locked thereto in any one of a number of positions of adjustment spaced apart in predetermined steps.

5. A micrometer adjustment device as claimed in claim 3, in which the auxiliary stop member is movable over the base and can be locked thereto in any one of a number of positions of adjustment spaced apart in predetermined steps.

6. A micrometer adjustment device as claimed in claim 3, in which the auxiliary stop member is constituted by a tube containing a spindle through which the micrometer thrust is applied to the gauge block, a limited degree of lost motion being provided between the tube and the spindle.

7. In a micrometer adjustment device, in combination, a base, a microscope mounting on said base, a carriage adjustable over said base, a micrometer mounted on the carriage, a fixed abutment on the base, an auxiliary stop member comprising a tube and a spindle extending along said tube, a spring acting between the carriage and said tube, the micrometer thrust being applied through said spindle to a gauge block which can be inserted between the spindle and the fixed abutment, a limited degree of lost motion being provided between the tube and the spindle, a follower carried by said base, means for effecting longitudinal and rotational adjustment of the tube relatively to the follower, the tube having a longitudinal slot engaged by said follower, and a plurality of lateral slots opening into said longitudinal slot at spaced intervals therein, so that the tube can be adjusted relatively to the fixed abutment in accordance with the operative dimension of a gauge block which can be inserted between the spindle and the abutment, and held in the position of adjustment by the follower engaging the appropriate lateral slot in the tube, and when the gauge block is removed, the spring load, which would otherwise cause the carriage and micrometer to crash through a distance corresponding to the spacing effected by the gauge block, is taken by the auxiliary stop member.

8. A micrometer adjustment device as claimed in claim 7, in which a torsion spring tends to turn the tubular stop member about its longitudinal axis so as to urge that edge of the longitudinal slot having the lateral slots towards the follower, so that if the mechanism is left with the follower lying in the longitudinal slot between two lateral slots and the end of the thrust spindle spaced from the fixed abutment, movement of the carriage over the base will merely result in the follower snapping into the nearest lateral slot under the action of the torsion spring.

9. A micrometer adjustment device as claimed in claim 7, in which the width of each lateral slot increases towards its open end so that the follower, pressed into a slot by the torsion spring, will be firmly held in position therein.

RICHARD EDMUND REASON.
THOMAS WILLIAM CLIFFORD.